UNITED STATES PATENT OFFICE.

MORRIS KASSER, OF SAN FRANCISCO, CALIFORNIA.

PRESERVED EGG AND PROCESS OF PRODUCING THE SAME.

1,424,484.   Specification of Letters Patent.   Patented Aug. 1, 1922.

No Drawing.   Application filed April 22, 1918.   Serial No. 230,146.

*To all whom it may concern:*

Be it known that I, MORRIS KASSER, a citizen of the United States, and a resident of the city and county of San Francisco and State of California, have invented a certain new and useful Preserved Egg and Processes of Producing the Same, of which the following is a specification.

The invention relates to preserved eggs and to a process of preserving eggs.

An object of the invention is to produce a preserved egg which will remain fresh and edible for a long period of time.

Another object of the invention is to provide an inexpensive and rapid process of preserving eggs.

The deterioration or decay of eggs is due to several reasons, one of which is the absorption of air with its contamination, through the pervious shell of the egg and the entry of bacteria through the shell. The shell of the egg is filled with pores through which air, odors or other agents may enter the egg and through which the moisture in the egg may evaporate.

In accordance with my invention, I seal the pores in the egg shell and form a film of coating of oil on the inner side of the shell, which operates to render the shell impervious. The sealing solution or agent which I employ is a vegetable oil which is edible and harmless to the egg. In practice I have used a mixture of cotton-seed oil and linseed oil, but it is to be understood that other vegetable oils may be employed with advantage. In carrying out my invention I provide a bath of the sealing solution which is maintained in zones of different temperature, the temperature of the zones varying from cold or warm to hot, and back to cold or warm. The eggs are submerged in the solution in the cold or warm zone and are moved through the solution toward the hot zone, the temperature of the solution in the successive zones being preferably gradually higher so that the moving eggs will not be subjected to abrupt excessive temperature changes. From the hot zone, the eggs, still submerged in the solution, are moved into a cold zone and after the eggs have cooled, they are removed from the solution. By moving the eggs through a solution, the temperature of which is gradually increasing in the direction of movement of the eggs, the eggs are gradually heated, causing an expansion and expulsion of the air within the shell. The eggs may be introduced directly into the hot zone, but in practice this would result in cracking many shells, and it is therefor advisable to temper the shell of the egg before it is subjected to the high temperature. The temperature of the solution in the hot zone and the time of exposure of the egg to the hot solution is not sufficient to coagulate the albumen of the egg, but is sufficient to thoroughly expel all air or gas from the shell. I have found that a temperature of from 170° to 200° Fahrenheit at the hot zone produces excellent results, although the temperature may be varied somewhat from these limits.

On passing from the hot zone into the cold zone, the contents of the shell are contracted, causing a reduction of pressure within the shell which causes solution to be drawn into and through the pores in the shell, forming a film or coating of solution on the inside of the shell and filling the pores. The egg is kept submerged in the solution during its cooling stage, so that the entrance of air or other deleterious agents into the shell is prevented.

It has been proposed heretofore to preserve eggs by submerging them for a short time in a liquid having a temperature above the boiling point of water and then removing them from the liquid and allowing them to cool, at which time air with its contaminating content will be drawn into the egg. My process clearly differentiates from this prior process by maintaining the egg submerged at all times during its cooling.

I claim:

1. The process of preserving eggs which consists in submerging the egg in a hot sealing solution and then cooling the egg while submerged in the sealing solution.

2. The process of preserving eggs which consists in submerging the egg in hot vegetable oil and cooling the egg while submerged in oil.

3. The process of preserving eggs which consists in providing a bath of sealing solution having hot and cold zones, submerging the egg in the hot zone and moving the submerged egg into the cold zone.

4. The process of preserving eggs which consists in providing a bath of sealing solution having hot and cold zones, submerging the egg in a cold zone, moving the submerged egg into the hot zone and then into a cold zone.

5. The process of preserving eggs which consists in providing a bath of vegetable oil having hot and cold zones, submerging the egg in a cold zone and moving the submerged egg through the hot zone into a cold zone.

6. The process of preserving eggs which consists in submerging the egg in hot vegetable oil and then moving the egg while maintaining its submergence into cold vegetable oil.

In testimony whereof I have hereunto set my hand at San Francisco, California, this 15th day of April, 1918.

MORRIS KASSER.

In presence of—
H. G. PROST.